(12) United States Patent
Janousek et al.

(10) Patent No.: US 8,663,869 B2
(45) Date of Patent: Mar. 4, 2014

(54) CRACK FREE SOFC ELECTROLYTE

(75) Inventors: Martin Janousek, Sunnyvale, CA (US);
Tad Armstrong, Burlingame, CA (US);
Dien Nguyen, San Jose, CA (US);
Ananda H. Kumar, Fremont, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 736 days.

(21) Appl. No.: 12/659,742

(22) Filed: Mar. 19, 2010

(65) Prior Publication Data

US 2010/0239937 A1   Sep. 23, 2010

Related U.S. Application Data

(60) Provisional application No. 61/202,639, filed on Mar. 20, 2009.

(51) Int. Cl.
*H01M 8/02* (2006.01)
*H01M 8/10* (2006.01)
*H01M 2/14* (2006.01)

(52) U.S. Cl.
USPC ........... 429/509; 429/508; 429/458; 429/459; 429/479; 429/514

(58) Field of Classification Search
USPC ................. 429/454–461, 508–510, 512–514, 429/517–522
See application file for complete search history.

(56) References Cited

U.S. PATENT DOCUMENTS

| | | |
|---|---|---|
| 4,135,041 A | 1/1979 | Jung et al. |
| 4,755,429 A | 7/1988 | Nickols et al. |
| 4,913,982 A | 4/1990 | Kotchick et al. |
| 5,045,413 A * | 9/1991 | Marianowski et al. ....... 429/460 |
| 5,162,167 A | 11/1992 | Minh et al. |
| 5,213,910 A | 5/1993 | Yamada |
| 5,215,946 A | 6/1993 | Minh |
| 5,248,712 A | 9/1993 | Takeuchi et al. |
| 5,256,499 A | 10/1993 | Minh et al. |
| 5,273,837 A | 12/1993 | Aiken et al. |
| 5,290,642 A | 3/1994 | Minh et al. |
| 5,342,705 A | 8/1994 | Minh et al. |
| 5,368,667 A | 11/1994 | Minh et al. |

(Continued)

FOREIGN PATENT DOCUMENTS

| | | |
|---|---|---|
| EP | 0615299 | 9/1994 |
| JP | 409199143 | 7/1997 |

(Continued)

OTHER PUBLICATIONS

Machine translation for Yoshida et al., JP 2006-190593 A.*

(Continued)

*Primary Examiner* — Edu E Enin-Okut
(74) *Attorney, Agent, or Firm* — The Marbury Law Group PLLC (57) ABSTRACT

A solid oxide fuel cell (SOFC) stack includes a plurality of SOFCs, and a plurality of interconnects, each interconnect containing a conductive perovskite layer on an air side of the interconnect. The stack in internally manifolded for fuel and the conductive perovskite layer on each interconnect is not exposed in the fuel inlet riser. The SOFC electrolyte has a smaller roughness in regions adjacent to the fuel inlet and fuel outlet openings in the electrolyte than under the cathode or anode electrodes.

15 Claims, 9 Drawing Sheets

(56) References Cited

U.S. PATENT DOCUMENTS

| | | | |
|---|---|---|---|
| 5,382,315 | A | 1/1995 | Kumar |
| 5,453,331 | A | 9/1995 | Bloom et al. |
| 5,494,700 | A | 2/1996 | Anderson et al. |
| 5,501,914 | A | 3/1996 | Satake et al. |
| 5,518,829 | A | 5/1996 | Satake et al. |
| 5,589,017 | A | 12/1996 | Minh |
| 5,589,285 | A * | 12/1996 | Cable et al. ............ 429/479 |
| 5,641,585 | A | 6/1997 | Lessing et al. |
| 5,733,499 | A | 3/1998 | Takeuchi et al. |
| 5,955,392 | A | 9/1999 | Takeuchi et al. |
| 6,001,761 | A | 12/1999 | Hata et al. |
| 6,361,892 | B1 | 3/2002 | Ruhl et al. |
| 6,492,053 | B1 | 12/2002 | Donelson et al. |
| 6,582,845 | B2 | 6/2003 | Helfinstine et al. |
| 6,589,681 | B1 | 7/2003 | Yamanis |
| 6,638,575 | B1 | 10/2003 | Chen et al. |
| 6,835,488 | B2 | 12/2004 | Sasahara et al. |
| 7,045,237 | B2 * | 5/2006 | Sridhar et al. ........... 429/465 |
| 2002/0012825 | A1 | 1/2002 | Sasahara et al. |
| 2002/0132156 | A1 | 9/2002 | Ruhl et al. |
| 2003/0170527 | A1 | 9/2003 | Finn et al. |
| 2003/0180602 | A1 | 9/2003 | Finn |
| 2004/0101742 | A1 | 5/2004 | Simpkins et al. |
| 2004/0131915 | A1 * | 7/2004 | Sherman et al. ........... 429/35 |
| 2004/0200187 | A1 | 10/2004 | Warrier et al. |
| 2005/0017055 | A1 | 1/2005 | Kurz et al. |
| 2005/0136312 | A1 | 6/2005 | Bourgeois et al. |
| 2005/0227134 | A1 | 10/2005 | Nguyen |
| 2007/0134532 | A1 | 6/2007 | Jacobson et al. |
| 2007/0231676 | A1 | 10/2007 | Cassidy et al. |
| 2008/0081223 | A1 * | 4/2008 | Yasumoto et al. ........... 429/12 |
| 2010/0119917 | A1 | 5/2010 | Kumar et al. |

FOREIGN PATENT DOCUMENTS

| | | | |
|---|---|---|---|
| JP | 09223506 | 8/1997 | |
| JP | 09245810 | 9/1997 | |
| JP | 09245811 | 9/1997 | |
| JP | 09277226 | 10/1997 | |
| JP | 2000-281438 | 10/2000 | |
| JP | 3145522 | 1/2001 | |
| JP | 2006190593 A * | 7/2006 | ............ H01M 8/02 |
| WO | WO 2006016628 A1 * | 2/2006 | ............ H01M 8/02 |

OTHER PUBLICATIONS

International Preliminary Report on patentability issued in PCT/US2010/027899, mailed on Sep. 29, 2011.

International Search Report issued in PCT/US2010/027899, mailed Oct. 20, 2010.

International Search Report and Written Opinion, Intl. Application PCT/US2010/027899. International Searching Authority: Korean Intellectual Property Office (ISA/KR), Oct. 20, 2010.

Haynes International High-Temperature Alloys, "HAYNES (Reg.) 214 (TM) alloy", pp. 1-19, no date available.

Haynes International High-Temperature Alloys, "HAYNES (Reg.) 230 (TM) alloy", pp. 1-27, no date available.

International Search Report dated Nov. 26, 2008, received in International application No. PCT/US07/08224.

Supplementary Partial European Search Report dated Jun. 2, 2008, received in International Application No. PCT/US0304808.

International Search Report dated Aug. 19, 2003, received in International Application No. PCT/US03/04808.

* cited by examiner

FIG. 8
PRIOR ART though it could be a low-temperature seal. As one of ordinary skill in the art would appreciate, this leaves a large amount of material to be filled in the seal area.

CRACK FREE SOFC ELECTROLYTE

CROSS REFERENCE TO RELATED PATENT APPLICATIONS

The present application claims benefit of U.S. provisional application No. 61/202,639, filed Mar. 20, 2009, which is incorporated herein by reference in its entirety.

BACKGROUND OF THE INVENTION

The present invention is generally directed to fuel cell components, and to solid oxide fuel cells in particular.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

Figure 1:
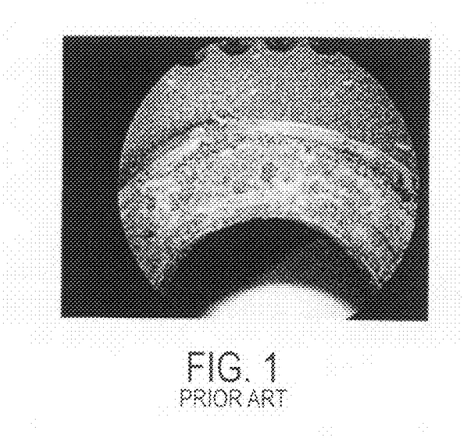
FIG. 1 is a close up of the corrosion and FIG. 2 is a top view of a SOFC containing a crack (circled).
Figure 2:
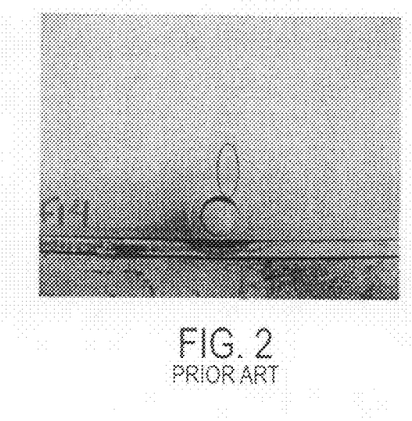

Fuel cell stacks are frequently built from a multiplicity of cells in the form of planar elements, tubes, or other geometries. Fuel cell stacks, particularly those with planar geometry, often use seals between electrolyte and interconnect surfaces to contain fuel and air at various locations within the stack. As shown in FIG. 1, in fuel cell stacks that are internally manifolded for fuel (i.e., in which fuel is provided through fuel riser openings in SOFCs and interconnects in the stack) electrolyte crack formation has been observed at ring seals initiated by cell electrolyte corrosion. A ring seal is a seal that surrounds the fuel inlet and fuel outlet riser openings between the cathode (i.e., air) side of a given SOFC and an air side of an adjacent interconnect (also known as a gas separator plate). This corrosion in conjunction with stresses which occur during operation lead to cracks, cell cracking and catastrophic failure at elevated temperatures (e.g., after 2 hours at 900 C) as shown in FIG. 2.

SUMMARY OF THE INVENTION

One aspect of the present invention provides a solid oxide fuel cell (SOFC) stack which includes a plurality of SOFCs, and a plurality of interconnects, each interconnect containing a conductive perovskite layer on an air side of the interconnect. The stack in internally manifolded for fuel and the conductive perovskite layer on each interconnect is not exposed in the fuel inlet riser. In another aspect of the invention, the SOFC electrolyte has a smaller roughness in regions adjacent to the fuel inlet and fuel outlet openings in the electrolyte than under the cathode or anode electrodes.

BRIEF DESCRIPTION OF THE DRAWINGS

FIGS. 1 and 2 are photographs showing cell electrolyte corrosion and cracking in prior art SOFC stacks.

DETAILED DESCRIPTION OF THE EMBODIMENTS

In the first embodiment of the invention, the present inventors realized that the cell electrolyte corrosion and cracking may be reduced or eliminated by reducing or eliminating contact between the fuel inlet and exhaust flow and a conductive perovskite material coated on the air side of the interconnect (i.e., the side of the interconnect which faces the cathode electrode of an adjacent SOFC in a fuel cell stack). Thus, in a stack that is internally manifolded for fuel, the conductive perovskite layer on each interconnect is not exposed in the fuel inlet and fuel outlet risers.

Without wishing to be bound by a particular theory, the inventors believe that at least one component of the fuel, such as hydrogen, attacks and/or reacts with the perovskite material, such as lanthanum strontium manganite, or a component thereof. The perovskite material or a component thereof then attacks and/or reacts with a glass seal material or a component thereof. This causes a breakdown of the glass seal material and one or more components of the glass material and/or one or more components of the perovskite material then attack and/or react with the ceramic electrolyte of the fuel cell to cause electrolyte cracking and/or corrosion. By preventing or reducing the contact between the fuel and the perovskite material, the cracking and/or corrosion are eliminated or reduced. Thus, the present inventors discovered that SOFC glass seals in combination with LSM and fuel gas can corrode the electrolyte leading to crack formation.

Figure 3:
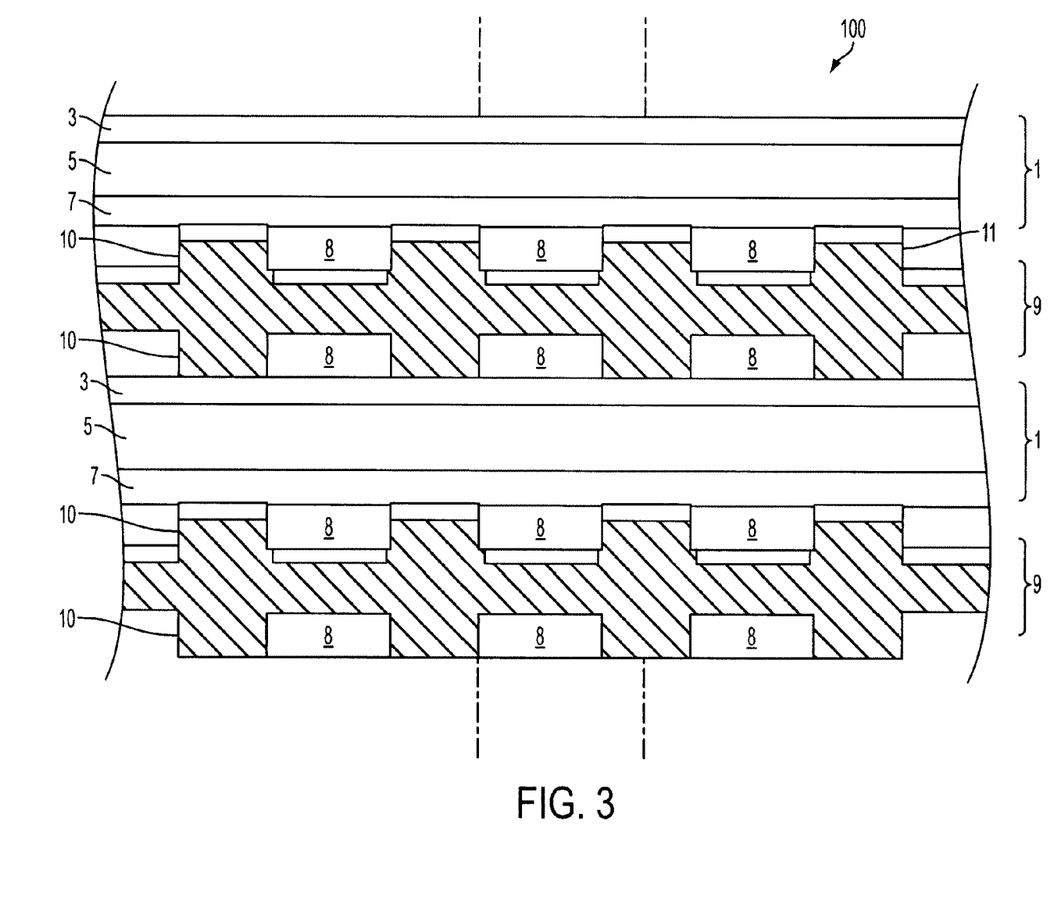
FIG. 3 illustrates a side cross sectional view of a SOFC stack along lines A-A in FIGS. 4A and 5A of an embodiment of the invention.

FIG. 3 illustrates a side cross sectional view through a middle of planar solid oxide fuel cell (SOFC) stack 100. The stack comprises a plurality of solid oxide fuel cells 1 and a plurality of interconnects/gas separator plates 9. Each cell 1 includes an anode electrode 3, a solid oxide electrolyte 5 and a cathode electrode 7. The anode electrode 3 may comprise a cermet having a metal phase, such as a nickel or nickel oxide phase and a ceramic phase, such as a doped ceria (such as samaria or gadolinia doped ceria) and/or a stabilized zirconia, such as yttria or scandia stabilized zirconia. The anode 3 may comprise one or more sublayers comprising the above described cermet or ceramic materials. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. The cathode electrode 7 may comprise an electrically conductive material, such as an electrically conductive perovskite material, such as lanthanum strontium manganite (LSM). Other conductive perovskites, such as LSCo, etc., or metals, such as Pt, may also be used.

FIG. 3 shows that the lower SOFC 1 is located between two interconnects 9. Each interconnect/gas flow separator plate 9 separates fuel, such as a hydrogen and/or a hydrocarbon fuel, flowing to the fuel electrode (i.e. anode 3) of one cell in the stack from oxidant, such as air, flowing to the air electrode (i.e. cathode 7) of an adjacent cell in the stack. The interconnect 9 contains gas flow passages or channels 8 between the ribs 10. The interconnect electrically connects the fuel electrode 3 of one cell to the air electrode 7 of the adjacent cell. The interconnect is made of or contains electrically conductive material, such as chromium or an alloy thereof, such as chromium-iron, chromium-yttrium, chromium-iron-yttrium, etc. A first electrically conductive contact layer, such as a perovskite layer 11, is provided on the air side of the interconnect 9 (i.e., between the interconnect and the cathode electrode 7 of an adjacent fuel cell 1). Layer 11 coats the tops of the ribs 10, the sides of the ribs 10 (not shown for clarity) and the bottoms of the flow passages 8. The perovskite layer 11 is preferably LSM, but may also comprise other perovskite materials, such as lanthanum strontium chromite or cobaltite. An optional second electrically conductive contact layer (not shown), such as a nickel contact layer, may be provided on the fuel side of the interconnect (i.e., between the anode electrode and the interconnect).

While vertically oriented stacks are shown in FIG. 3, the fuel cells may be stacked horizontally or in any other suitable direction between vertical and horizontal. The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

Figure 4A:
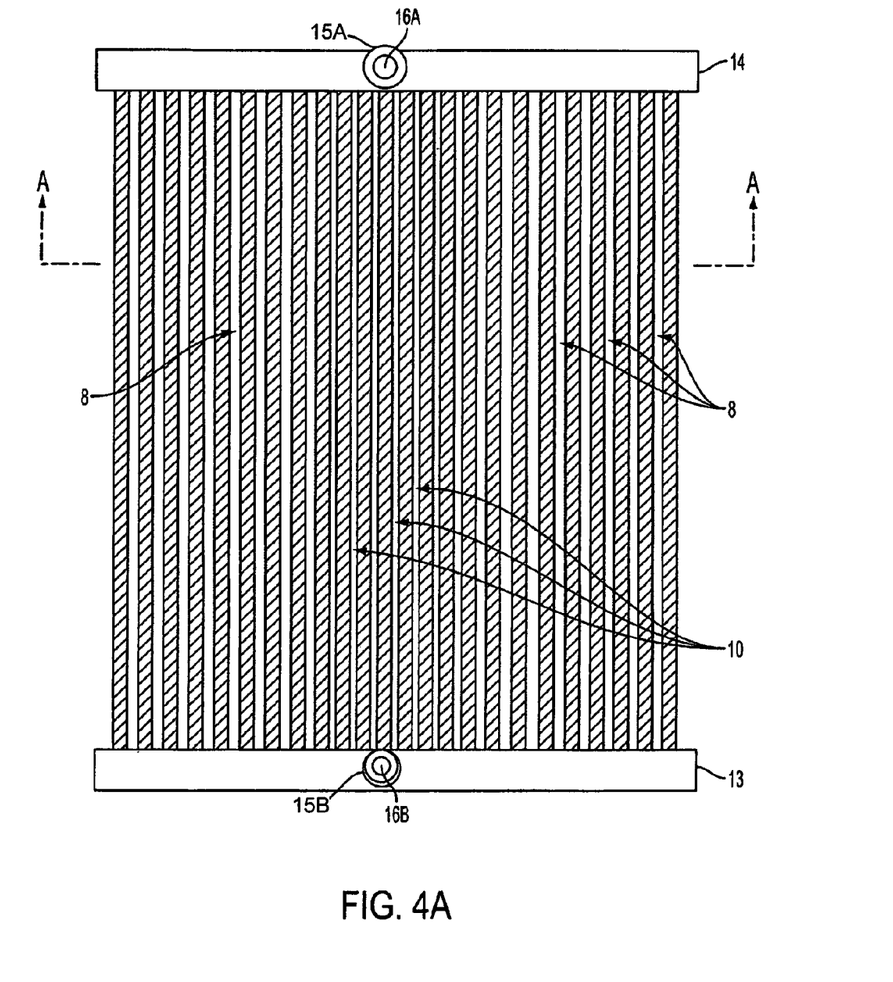
FIGS. 4A and 4B are top views of an air side of an interconnect of an embodiment of the present invention.
Figure 4B:
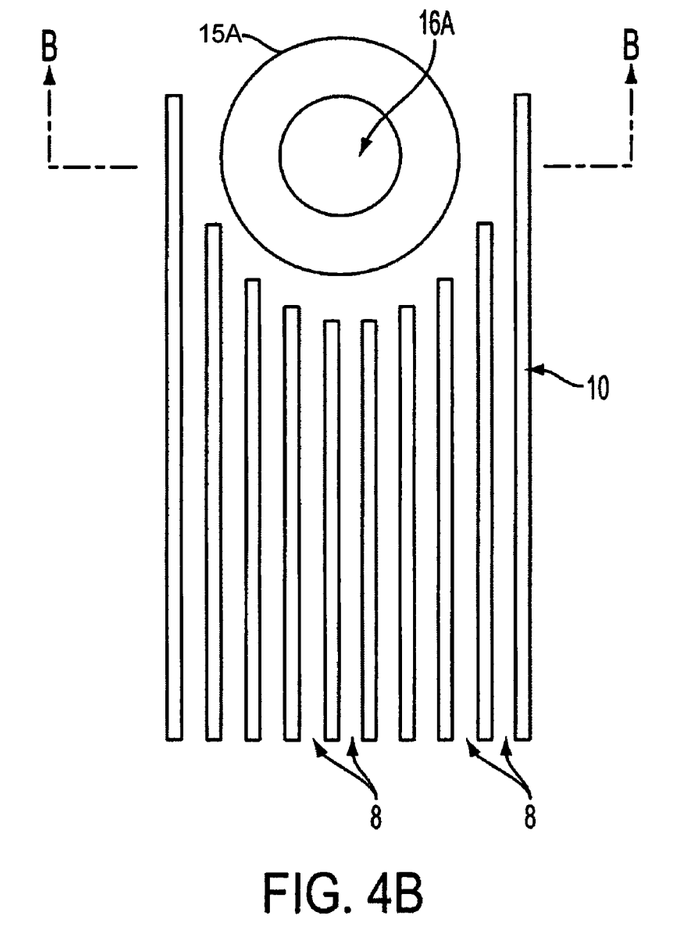

FIG. 4A shows the air side of an exemplary interconnect 9. The interconnect may be used in a stack which is internally manifolded for fuel and externally manifolded for air. The interconnect contains air flow passages or channels 8 between ribs 10 to allow air to flow from one side 13 to the opposite side 14 of the interconnect. Ring seals 15A, 15B are located around fuel inlet and outlet openings 16A, 16B (i.e., through holes 16A, 16B in interconnect 9). Strip seals (not shown) are located on lateral sides of the interconnect 1. FIG. 4B shows a close up view of an exemplary seal 15A, passages 8 and ribs 10. The seals 15A, 15B may comprise any suitable seal glass or glass ceramic material, such as borosilicate glass. Alternatively, the seals 15A, 15B may comprise a glass ceramic material described in U.S. application Ser. No. 12/292,078 filed on Nov. 12, 2008, incorporated herein by reference. Preferably, the seal glass has a very low solubility and a low diffusion coefficient for LSM components (e.g., Mn) to prevent reaction of the fuel with the LSM or its components.

The interconnect 9 may contain an upraised or boss region below the seal 15A, 15B if desired. If desired, the interconnect may be configured for a stack which is internally manifolded for both air and fuel. In this case, the interconnect and the corresponding fuel cell electrolyte would also contain additional air inlet and outlet openings.

Figure 4C:
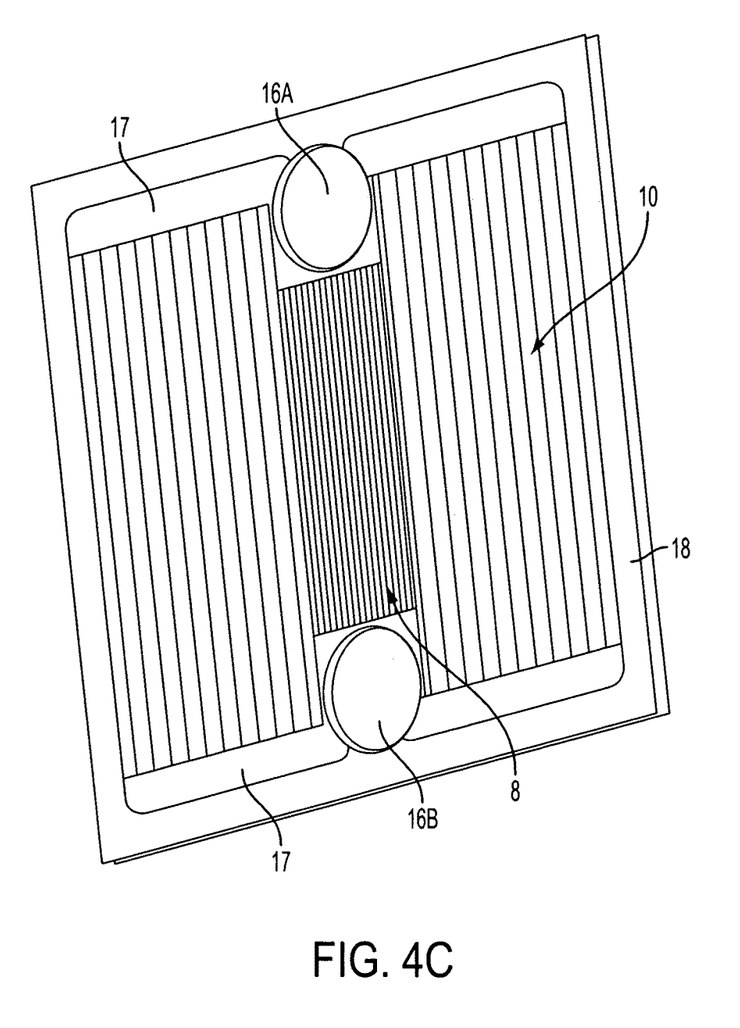
FIG. 4C is a top view of a fuel side of the interconnect.

FIG. 4C illustrates the fuel side of the interconnect 9. A window seal 18 is located on the periphery of the interconnect 9. Also shown are fuel distribution plenums 17 and fuel flow passages 8 between ribs 10. It is important to note that the interconnect shown in FIG. 4C has two types of fuel flow passages; however, this is not a limitation of the present invention. The fuel side of an interconnect may have fuel flow passages that are all the same depth and length, or a combination of short and long, and/or deep and shallow passages.

Figure 5A:
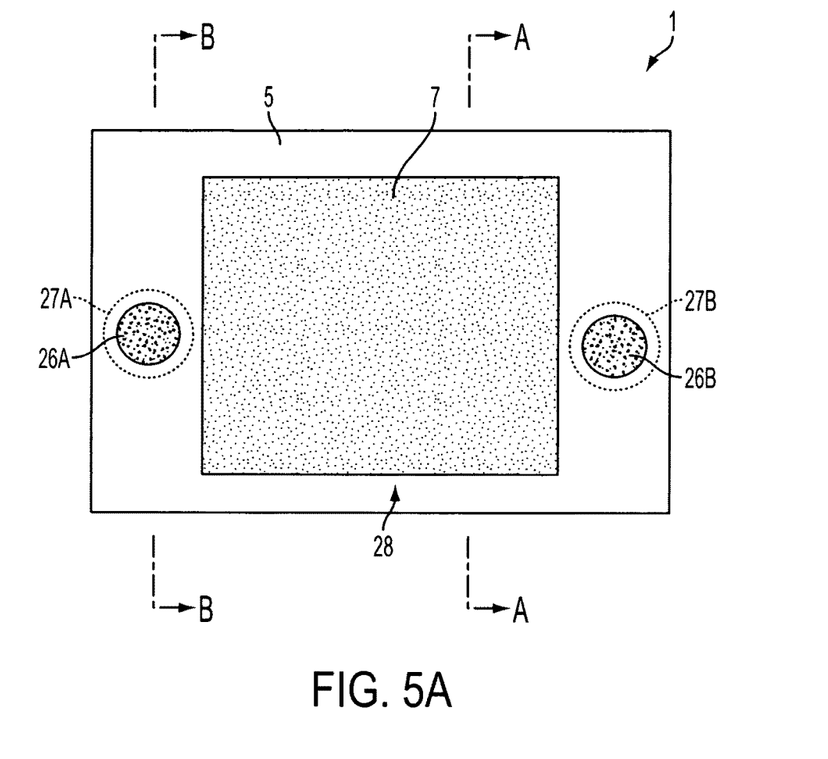
FIGS. 5A and 5B are top views of an air side of fuel cells of an embodiment of the invention.

FIG. 5A illustrates a top view of one SOFC 1 of the stack 100. As shown in FIG. 5A, the SOFC 1 is positioned with the air side of the electrolyte 5 pointing up. The cathode electrode 7 is located in the middle portion of the electrolyte 5. The anode electrode 3 is located on the bottom of the electrolyte and is not shown in FIG. 5A. The electrolyte 5 contains a fuel inlet opening 26A and a fuel outlet opening 26B. The electrolyte also contains ring shaped regions 27A, 27B around the openings 26A, 26B, respectively, and a peripheral region 28 which will be described in more detail with respect to the second embodiment below. The side cross sectional view of the stack shown in FIG. 3 is taken along lines A-A in FIGS. 4A and 5A. The SOFC 1 is configured for a stack that is internally manifolded for fuel and externally manifolded for air. Alternatively, the SOFC 1 may be configured for a stack which is internally manifolded for both air and fuel. In this case, the electrolyte would contain additional air inlet and outlet openings.

Openings 26A, 26B in electrolyte 5 are lined up with the respective openings 16A, 16B in the interconnect 9 to form portions of the fuel inlet and outlet risers of the stack, as will be described in more detail with respect to FIG. 6 below. A fuel riser is a series of connected openings through the interconnect 9 and/or through one or more layers of the SOFC 1, such as the anode, cathode, and/or electrolyte through which a fuel inlet or fuel outlet streams pass through the stack 100.

Figure 6:
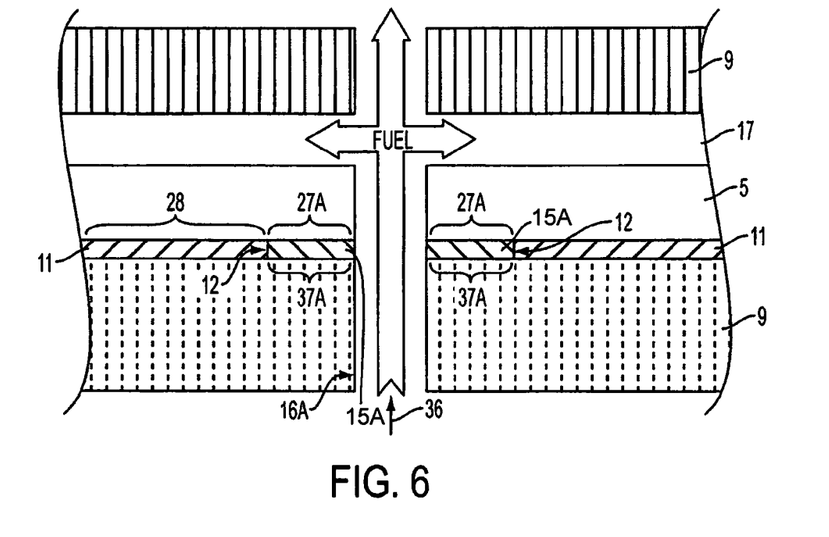
FIG. 6 illustrates a portion of a side cross sectional view of a SOFC stack along lines B-B in FIGS. 4B and 5A of an embodiment of the invention.

FIG. 6 illustrates a portion of a side cross sectional view along lines B-B in FIGS. 4B and 5A of the fuel inlet riser portion of the SOFC stack 100. FIG. 6 illustrates how the conductive perovskite layer, such as an LSM layer 11, on each interconnect 9 is not exposed in the fuel inlet riser 36 (i.e., not exposed to the fuel inlet flow channel or path through the fuel inlet riser). The conductive perovskite layer 11 is not located adjacent to at least the fuel inlet opening 16A on the air side of each interconnect 9. For example, layer 11 covers an entire air side of the interconnect 9 (including the channels 8 and ribs 10) except regions adjacent to the fuel inlet opening 16A and a fuel outlet opening 16B in the interconnect. For example, layer 11 may be omitted from regions covered by the ring shaped seals 15A, 15B.

Figure 7:
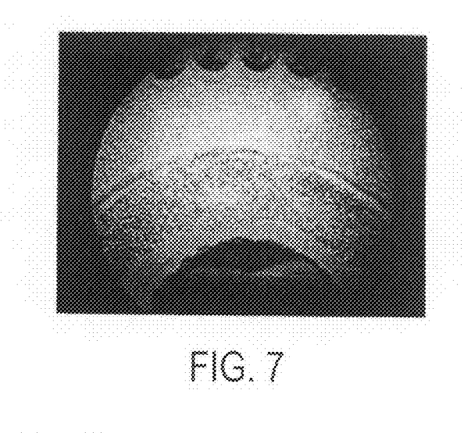
FIG. 7 is a photograph of an area of a fuel cell stack in which the LSM is removed around the fuel opening.

Thus, as shown in FIG. 6, one ring shaped glass (or glass ceramic) seal 15A is located on the air side of each interconnect 9 between a first edge surface 12 of the conductive perovskite layer 11 and the fuel inlet opening 16A (i.e., a portion of the fuel inlet riser 36). The interior opening in the seal 15A is located over the opening 16A in the interconnect which form a portion of the fuel inlet riser 36. The seal 15A also contacts an electrolyte 5 of an adjacent SOFC 1 in a region adjacent to a fuel inlet opening 26A in the electrolyte, such that the opening 26A in the electrolyte, the interior opening in the seal 15 and the opening 16A in the interconnect form a larger portion of the fuel inlet riser 36. Thus, the LSM layer 11 does not form a sidewall of the fuel inlet riser 36 and is not exposed to the fuel flow in the fuel inlet riser. The LSM layer 11 is offset from the fuel inlet riser by a distance 37A. FIG. 7 shows a photograph of a portion of the interconnect 9 where the LSM layer 11 is offset from the fuel opening.

As shown in FIG. 4A, a second ring shaped glass seal 15B is located on the air side of each interconnect 9 between a second edge surface of the conductive perovskite layer 11 and the fuel outlet opening 16B. An interior opening in the second seal is located over the opening 16B (i.e., the outlet opening) in the interconnect 9. The second seal contacts an electrolyte of an adjacent SOFC adjacent to fuel outlet opening 26B in the electrolyte. The opening 26B in the electrolyte, the interior opening in the second seal 15B and the opening 16B in the interconnect form a portion of the fuel outlet riser. The conductive perovskite layer 11 is also not exposed in the fuel outlet riser.

Without wishing to bound by a particular theory, it is believed that the seal 15A, 15B prevents contact between the fuel inlet stream in riser 36 and the offset LSM layer 11, as shown in FIG. 6. Thus, the fuel, such as hydrogen, does not attack and/or react with the LSM layer 11. The LSM layer 11 in turn does not attack and/or react with a glass seal 15A, 15B material or a component thereof. This avoids breakdown of the glass seal material. Thus, by preventing or reducing the contact between the fuel and the perovskite material, the cracking and/or corrosion are eliminated or reduced.

Figure 8:
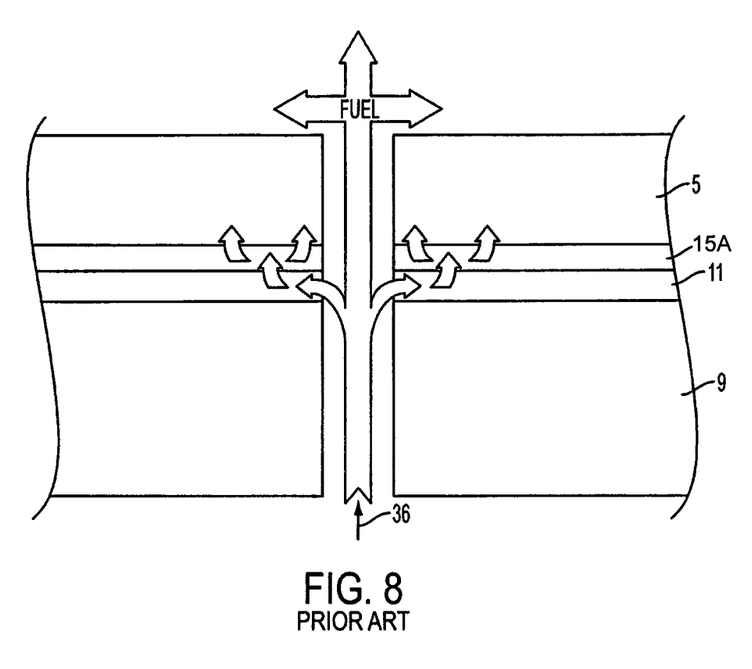
FIG. 8 illustrates a portion of a side cross sectional view of a prior art SOFC stack.

In contrast, as shown in FIG. 8, in the prior art SOFC stack, the LSM layer 11 forms a portion of the fuel inlet riser 36 (i.e., layer 11 forms a portion of the sidewall of the riser). The seal 15A is located above the LSM layer 11. In the prior art configuration, it is believed that at least one component of the fuel, such as hydrogen, attacks and/or reacts with the LSM, which then attacks and/or reacts with a glass seal material or a component thereof. This causes a breakdown of the glass seal material and one or more components of the glass material and/or one or more components of the perovskite material then attack and/or react with the ceramic electrolyte 5 of the fuel cell to cause electrolyte cracking and/or corrosion, as shown by arrows in FIG. 8.

Figure 5B:
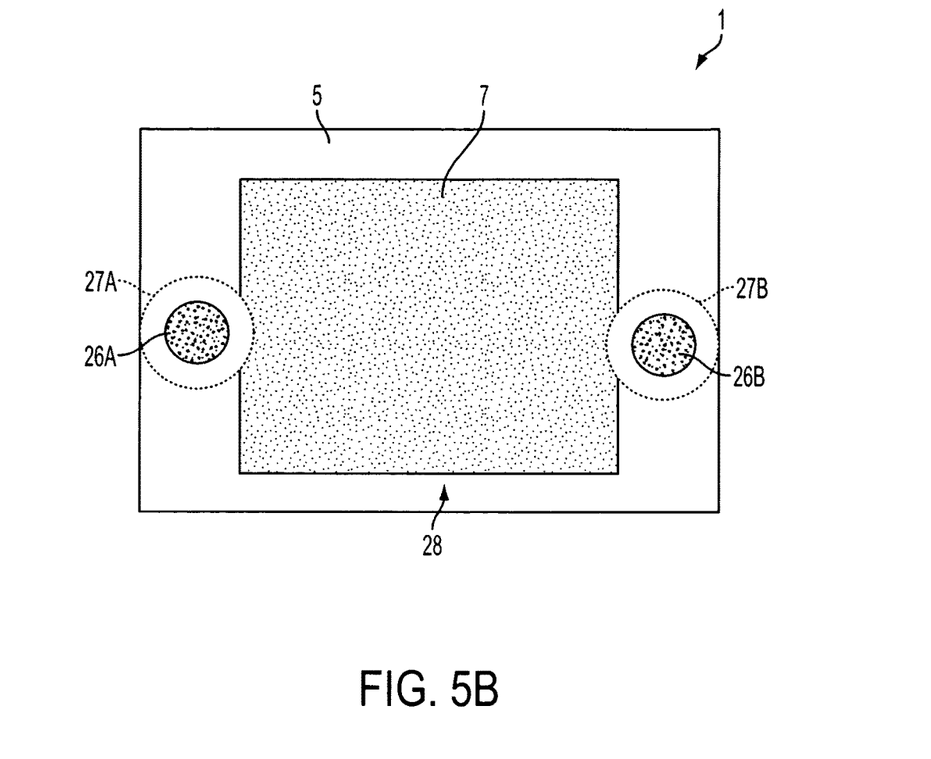

In a second embodiment of the invention, at least one side of the electrolyte 5, such as the air side, has a smaller roughness in first 27A and second 27B regions adjacent to the fuel inlet and fuel outlet openings 26A, 26B than in a third region under the cathode electrode 7, as shown in FIGS. 5A and 5B. Regions 27A, 27B may comprise ring shaped regions which surround the fuel inlet and outlet openings 26A, 26B. Regions 27A, 27B may have any suitable shape, such as hollow circular, oval, polygonal, etc. The fuel cell electrodes, such as the anode or cathode, may have a straight edge, as shown in FIG. 5A, with the regions 27A, 27B located adjacent to the straight edges. Alternatively, the boundaries of the smooth electrolyte regions 27A, 27B may protrude into the side portions of the electrodes 3 or 7. In this case, the electrodes 3, 7 may have a curved side edges as shown in FIG. 5B.

Preferably, the first and second embodiments are used in combination. In other words, the offset LSM layer 11 may be used in combination with smoothed regions 27A, 27B on the electrolyte 5. Thus, the ring seals 15A, 15B are located in contact with regions 27A, 27B. Regions 27A, 27B may have about the same size (i.e., diameter and/or area) as the ring seals 15A, 15B. However, regions 27A and 27B may have a larger or smaller size than the seals 15A, 15B if desired. Furthermore, the first and second embodiments may be used separately, and the stack 100 may contain only one of the offset interconnect LSM layer 11 of the first embodiment or the smooth electrolyte region(s) 27A, 27B of the second embodiment.

For example, the air side of the electrolyte 5 has a roughness, $R_a$, of less than 4 microinches, such as 1 to 3 microinches in the first 27A and the second 27B regions and a roughness of greater than 32 microinches, such as 35 to 75 microinches in the third region under the cathode electrode 7.

The electrolyte 5 also includes peripheral fourth region 28. Region 28 surrounds the anode or cathode electrode 3 or 7 and the active region of the electrolyte 5 under the electrode(s). Region 28 excludes the first 27A, second 27B and third (under electrode) regions. The fourth region 28 may have a roughness which is greater than a roughness of the first 27A and second 27B regions and which is same as or less than a roughness of the third region under the electrode(s). For example, region 28 may have a roughness of 8-75 microinches, such as 8-12 microinches.

While the air side of the electrolyte 5 is shown in FIGS. 5A and 5B, it should be noted that the fuel side of the electrolyte may also contain smoother in first and second regions adjacent to the fuel inlet and fuel outlet openings than in a third region under the anode electrode instead of or in addition to the same regions on the air side of the electrolyte.

A method of forming a planar, electrolyte supported SOFC stack shown in FIGS. 3 and 6 includes forming SOFCs 1 and interconnects 9 and alternating these SOFCs and interconnects in a stack 100. The method of forming the SOFC 1 comprises providing a green ceramic electrolyte having an initial roughness. The green electrolyte may be formed by tape casting or other suitable ceramic fabrication methods. The green electrolyte contains a binder and optionally other suitable additives that are removed during subsequent firing or sintering. The green electrolyte may have an as-cast roughness, $R_a$, of 8-12 microinches.

Then, the fuel inlet and fuel outlet openings 26A, 26B are punched in the green electrolyte. The openings 26A, 26B may be punched after the electrolyte 5 is formed into its final shape from a green tape. Alternatively, the electrolyte 5 may be punched into its final shape (such as a rectangular shape) from a green tape during the same punching step as the opening 26A, 26B punching step. In other words, the same punch apparatus may be used to punch out the electrolyte from the green tape and form openings in the electrolyte during a single punch step. Preferably, the punch die has a smoother surface adjacent to the tip portion used to punch the openings. The smooth surface of the punch die smoothes the surface in regions 27A, 27B of the electrolyte 5 such that these regions have a roughness of less than 4 microinches. Opposing punch die may have opposing smooth surfaces adjacent to the tip used to punch the openings to form the smooth regions 27A, 27B on both sides of the electrolyte 5. Alternatively, only one die may have a smooth surface to form smooth regions on only one side of the electrolyte 5.

Optionally, one or both die of the punch apparatus may also have a rough surface to roughen the active regions on one or both sides of the electrolyte 5 under the cathode and/or anode electrodes to achieve a roughness of greater than 32 microinches. Thus, the electrolyte may be hole punched, smoothed around the openings and roughened in the active area in the same punching/pressing steps. Peripheral region 28 may be left with the initial as-cast roughness of about 8-12 microinches or it may be roughened together with the active region (s). Alternatively, other suitable smoothing and/or roughening methods described in U.S. Pat. No. 7,045,237, which is incorporated herein by reference in its entirety, may be used instead of the die punching methods.

After the smoothing/roughening step, a cathode electrode is formed on the first side of the electrolyte in a third roughened region and an anode electrode is formed on the second side of the electrolyte (such as on a roughened region on the fuel side of the electrolyte). The electrodes may be formed by screen printing or other suitable deposition methods. At least one of the electrolyte, cathode electrode and the anode electrode are then fired or sintered. One or more firing or sintering steps may be conducted. For example, one firing step may be conducted after the hole punching, another firing step after cathode deposition and a third firing step after the anode deposition. The anode and cathode deposition may be performed in either order. The three firing steps may be combined into two firing steps or into a single firing step after both electrodes are deposited.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A solid oxide fuel cell (SOFC) stack, comprising:
a plurality of SOFCs;
a plurality of interconnects, each interconnect containing a conductive perovskite layer coated on an air side of the interconnect, and each interconnect containing a fuel inlet opening through the interconnect which forms a portion of a fuel inlet riser; and
a first seal located on the air side of each interconnect adjacent to the conductive perovskite layer between a first edge surface of the conductive perovskite layer and the fuel inlet opening;
wherein:
the stack is internally manifolded for fuel;
the conductive perovskite layer on each interconnect is not exposed in the fuel inlet riser;
the conductive perovskite layer is not located adjacent to at least the fuel inlet opening on the air side of each interconnect;
the conductive perovskite layer is offset by a distance from the at least the fuel inlet opening;
an interior opening in the first seal is located over the fuel inlet opening in the interconnect to form a first portion of the fuel inlet riser; and
the first seal contacts an electrolyte of an adjacent SOFC adjacent to a fuel inlet opening in the electrolyte, such that the fuel inlet opening in the electrolyte, an interior opening in the first seal and the fuel inlet opening in the interconnect form a second portion of the fuel inlet riser, such that the conductive perovskite layer does not form a sidewall of the fuel inlet riser and is not exposed to fuel flow in the fuel inlet riser.

2. The stack of claim 1, wherein the first seal comprises a ring shaped glass seal.

3. The stack of claim 1, wherein the conductive perovskite layer comprises a lanthanum strontium manganite (LSM) layer which covers an entire air side of the interconnect except areas adjacent to the fuel inlet opening and a fuel outlet opening in the interconnect.

4. The stack of claim 3, further comprising a second seal located on the air side of each interconnect between a second edge surface of the conductive perovskite layer and the fuel outlet opening.

5. The stack of claim 4, wherein:
the second seal comprises a ring shaped glass seal;
an interior opening in the second seal is located over a fuel outlet opening in the interconnect;
the second seal contacts an electrolyte of an adjacent SOFC adjacent to a fuel outlet opening in the electrolyte;
the fuel outlet opening in the electrolyte, the interior opening in the second seal and the fuel outlet opening in the interconnect form a portion of the fuel outlet riser; and
the conductive perovskite layer is not exposed in the fuel outlet riser.

6. The stack of claim 5, wherein:
each SOFC of the plurality of SOFCs comprises a solid oxide electrolyte, a cathode electrode located on a first side of the electrolyte and an anode electrode located on a second side of the electrolyte;
the cathode electrode faces the conductive perovskite layer on the air side of an adjacent interconnect; and
the anode electrode faces a fuel side of another adjacent interconnect.

7. The stack of claim 6, wherein the first side of the electrolyte is smoother in first and second regions adjacent to the fuel inlet and the fuel outlet openings in the electrolyte than in a third region under the cathode electrode.

8. The stack of claim 7, wherein the first side of the electrolyte has a roughness of less than 4 microinches in the first and the second regions and a roughness of greater than 32 microinches in the third region.

9. The stack of claim 1, wherein the stack is externally manifolded for air.

10. A solid oxide fuel cell (SOFC) stack, comprising:
a plurality of SOFCs;
a plurality of interconnects, each interconnect containing an electrically conductive contact layer coated on an air side of the interconnect, and each interconnect containing a fuel inlet opening through the interconnect which forms a portion of a fuel inlet riser; and
a first seal located on the air side of each interconnect adjacent to the electrically conductive contact layer between a first edge surface of the electrically conductive contact layer and the fuel inlet opening;
wherein:
the stack in is internally manifolded for fuel;
the electrically conductive contact layer on each interconnect is not exposed in the fuel inlet riser;
the electrically conductive contact layer is not located adjacent to at least the fuel inlet opening on the air side of each interconnect;
the electrically conductive contact layer is offset by a distance from the at least the fuel inlet opening;
an interior opening in the first seal is located over the fuel inlet opening in the interconnect to form a first portion of the fuel inlet riser; and
the first seal contacts an electrolyte of an adjacent SOFC adjacent to a fuel inlet opening in the electrolyte, such that the fuel inlet opening in the electrolyte, an interior opening in the first seal and the fuel inlet opening in the interconnect form a second portion of the fuel inlet riser, such that the electrically conductive contact layer does not form a sidewall of the fuel inlet riser and is not exposed to fuel flow in the fuel inlet riser.

11. The stack of claim 10, wherein the first seal comprises a ring shaped glass seal.

12. The stack of claim 10, wherein the electrically conductive contact layer covers an entire air side of the interconnect except areas adjacent to the fuel inlet opening and a fuel outlet opening in the interconnect.

13. The stack of claim 12, wherein the electrically conductive contact layer comprises manganese.

14. The stack of claim 13, wherein the electrically conductive contact layer comprises a conductive perovskite layer.

15. The stack of claim 14, wherein the conductive perovskite layer comprises a lanthanum strontium manganite (LSM) layer.

* * * * *